United States Patent
Liu et al.

(10) Patent No.: US 11,588,672 B2
(45) Date of Patent: Feb. 21, 2023

(54) INITIALIZATION AND USE OF DEMODULATION REFERENCE SIGNAL

(71) Applicant: ZTE Corporation, Guangdong (CN)

(72) Inventors: Wenhao Liu, Guangdong (CN); Peng Hao, Guangdong (CN); Feng Bi, Guangdong (CN); Zhisong Zuo, Guangdong (CN); Ting Miao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 382 days.

(21) Appl. No.: 16/947,652

(22) Filed: Aug. 11, 2020

(65) Prior Publication Data

US 2020/0374170 A1 Nov. 26, 2020

Related U.S. Application Data (63) Continuation of application No. PCT/CN2018/076804, filed on Feb. 14, 2018.

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01)

(58) Field of Classification Search
CPC ............. H04L 27/2613; H04L 25/0226; H04L 5/0007; H04L 5/0005; H04L 5/0048; H04L 5/005; H04L 5/0051; H04L 5/0008; H04L 5/001; H04L 5/0012; H04J 13/00; H04J 13/0055
See application file for complete search history.

(56) References Cited

U.S. PATENT DOCUMENTS

| 2017/0099174 A1 | 4/2017 | Kim et al. |
| 2018/0041976 A1 | 2/2018 | Chang et al. |
| 2019/0013917 A1* | 1/2019 | Nam ..................... H04L 5/0048 |

FOREIGN PATENT DOCUMENTS

| CN | 106105085 A | 11/2016 |
| EP | 3062571 A1 | 8/2016 |

OTHER PUBLICATIONS

Chinese Office Action dated Nov. 1, 2021 for CN Application No. CN201880087642.6, filed on Jul. 24, 2020 with unofficial translation (24 pages).

(Continued)

*Primary Examiner* — Ian N Moore
*Assistant Examiner* — Brian T Le
(74) *Attorney, Agent, or Firm* — Perkins Coie LLP (57) ABSTRACT

Methods, systems, and devices are disclosed for digital wireless communication, and more specifically, for initializing and using demodulation reference signals. In one exemplary aspect, a method of wireless communication performed by a communication node includes generating a first portion of an initial value of a demodulation reference signal (DMRS) based, at least in part, on combining a time index and at least a portion of an ID index. The method also includes generating a second portion of the initial value of the DMRS based, at least in part, on the ID index, and generating the initial value of the DMRS by combining at least the first and second portions. The method further includes transmitting or receiving the DMRS.

18 Claims, 7 Drawing Sheets

(56) References Cited

OTHER PUBLICATIONS

ITL, "Remaining details on DMRS for NR," 3GPP TSG RAN WGI Meeting #91 Reno, USA, Nov. 27-Dec. 1, 2017, R1-1720765, 11 pages.
International Search Report and Written Opinion dated Oct. 26, 2018 for International Application No. PCT/CN2018/076804, filed on Feb. 14, 2018 (7 pages).
Motorola Mobility "Downlink RS Configuration for CoMP" 3GPP TSG RAN1 #68, R1-120523, Dresden, Germany Feb. 6-10, 2012, 3 pages.
Intel Corporation, "Email discussion on DMRS Sequence for NR PBCH," 3GPP TSG RAN WG1 #90 Meeting R1-1712265, Prague, Czech Republic Aug. 21-25, 2017, 24 pages.

\* cited by examiner

FIG. 1

Initial Value of DMRS

| Combination value is scaled by 2^10; HBF with bit width of 22 bits | LBF with bit width of 9 bits |
|---|---|

FIG. 2

Initial Value of DMRS

| Combination value is scaled by 2^17; HBF with bit width of 22 bits | LBF with bit width of 9 bits |
|---|---|

FIG. 3

Initial Value of DMRS

| Combination value is scaled by 2^16; HBF with bit width of 15 bits | LBF with bit width of 16 bits |

INITIALIZATION AND USE OF DEMODULATION REFERENCE SIGNAL

CROSS REFERENCE TO RELATED APPLICATIONS

This patent document is a continuation of and claims benefit of priority to International Patent Application No. PCT/CN2018/076804, filed on Feb. 14, 2018. The entire content of the before-mentioned patent application is incorporated by reference as part of the disclosure of this application.

TECHNICAL FIELD

This document is directed generally to digital wireless communications.

BACKGROUND

Mobile communication technologies are moving the world toward an increasingly connected and networked society. The rapid growth of mobile communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

SUMMARY

This document relates to methods, systems, and devices related to digital wireless communication, and more specifically, for the initialization and use of demodulation reference signal (DMRS) in a control channel of a wireless network.

In one exemplary aspect, a method of wireless communication performed by a communication node includes generating a first portion of an initial value of a demodulation reference signal (DMRS) based, at least in part, on combining a time index and at least a portion of an ID index. The method also includes generating a second portion of the initial value of the DMRS based, at least in part, on the ID index, and generating the initial value of the DMRS by combining at least the first and second portions. The method further includes transmitting or receiving the DMRS.

In some embodiments, the communication node includes at least one of a base station (BS) or user equipment (UE).

In some embodiments, the DMRS corresponds to a sequence having a length of 31 bits.

In some embodiments, the first portion corresponds to a higher bit field of the DMRS. In some embodiments, the higher bit field corresponds to a plurality of consecutive bits including the most significant bit (MSB) of the DMRS.

In some embodiments, the second portion corresponds to a lower bit field of the DMRS. In some embodiments, the lower bit field corresponds to a plurality of consecutive bits including the least significant bit (LSB) of the DMRS.

In some embodiments, the time index is based on at least one of a system frame number (SFN), a slot index, or an Orthogonal Frequency-Division Multiplexing (OFDM) symbol number.

In some embodiments, the ID index is based on at least one of a cell ID or a configured ID communicated via Radio Resource Control (RRC) signal.

In some embodiments, generating the initial value of the DMRS comprises at least one modulo operation.

In some embodiments, combining the time index and at least a portion of the ID index includes combining the time index and the entirety of the ID index.

In some embodiments, combining the time index and at least a portion of the ID index includes multiplying a value corresponding to the time index with a value corresponding to the at least a portion of the ID index.

In some embodiments, the at least a portion of the ID index includes one or more selected bits of the ID index.

In some embodiments, combining the time index and at least a portion of the ID index includes converting the at least a portion of the ID index into another value. In some embodiments, converting includes one or more exclusive or (XOR) operations.

In another exemplary aspect, an apparatus for wireless communication that is configured or operable to perform the above-described methods is disclosed.

In yet another exemplary aspect, the above-described methods are embodied in the form of processor-executable code and stored in a computer-readable program medium.

The above and other aspects and their implementations are described in greater detail in the drawings, the descriptions, and the claims.

DETAILED DESCRIPTION

Overview

The technology and examples of implementations in this document can be used to improve performance in multiuser wireless communication systems. The term "exemplary" is used to mean "an example of" and, unless otherwise stated, does not imply an ideal or a preferred embodiment. Section headers are used in the present document to facilitate understanding and do not limit the disclosed technology in the sections only to the corresponding section.

In wireless communication systems, signal can experience various fading and noise. Besides, transceiver precision error can also affect demodulation performance. As a mechanism to compensate transceiver precision and restore constellation, DMRS can be used to estimate equivalent channel impulse responses. For example, in Long Term Evolution (LTE) systems, to enable data demodulation at a user equipment (UE) or base station (BS), demodulation reference signals are inserted in the Orthogonal Frequency-Division Multiplexing (OFDM) time-frequency grid to allow for effective channel estimation. Examples of UEs include smart phones, wearable devices, intelligent electric meters, and so on.

In the standardization of New Radio (NR) technology, agreement has been reached that DMRS sequence for Physical Downlink Control Channel (PDCCH) should be initialized with an equation including at least a symbol index, a slot index, and an ID, DMRS sequence for PDCCH should be generated per symbol, and the same length-31 Gold sequence as used in LTE should be used for scrambling PDCCH and the DMRS for PDCCH.

In LTE, DMRS is generated based on slot index and ID index, but the value ranges of these indices are relatively small. Because the value ranges of the same or similar indices can be larger in future radio communication systems, the current scheme as used in LTE not sufficient (e.g., the value of a generated DMRS sequence can exceed the 31-bit limit). A straightforward solution is to introduce a modulo operation for DMRS initial value determination. But modulo operation can lead to sequence collisions, i.e., a same initial sequence value may be generated for two or more different sets of indices or other parameters. The technology disclosed in the present document can be used to implement methods and apparatus for initializing and using demodulation reference sequences that at least reduce the risk of DMRS sequence collision and thus improve wireless communication performance.

In accordance with some embodiments of the presently disclosed technology, DMRS is generated based on at least two types of parameters, one related to time and the other related to an ID. A DMRS initial value (represented as a sequence of bits) can be divided into a higher-bit field (HBF) and a lower-bit field (LBF). Illustratively, the HBF can correspond to "left-hand side" bits including the most significant bit (MSB) and the LBF can correspond to "right-hand side" bits including the least significant bit (LSB). The entirety of ID information (e.g., values of every bit of the ID) can be used to calculate the initial value of the LBF, and at least a part of the ID information (e.g., a selected subset of ID bit values) can be used to calculate the initial value of the HBF.

The presently disclosed technology can avoid sequence collision between two or more different IDs in a synchronous network, because the values of the LBF can be different based on distinct IDs. The participation of a portion (or the entirety) of ID bit information in HBF calculation can further contribute to cross-correlation performance improvements.

More specifically, when values of all bits of an ID are used for HBF calculation, the generated value may be so large that it can exceed the field length of the HBF. In these embodiments, additional operations (e.g., modulo operation) can be applied to generated value.

When a subset of ID bits are used for higher bit field calculation, the generated value may be confined within a certain range. In these embodiments, the modulo operation can be avoided. For example, the number of bits (e.g., bit width) selected from the ID can be based on the actual value range of time index and ID index. If the value range of the time index is narrower, then more bits of the ID can be selected to participate in the calculation of the HBF initial value. In some embodiments, a largest value of time index can be used to determine a limit on the number of ID bits that can be used for HBF calculation, so that the calculation will not generate a value that exceeds the HBF field length.

DMRS Initialization

Figure 1:
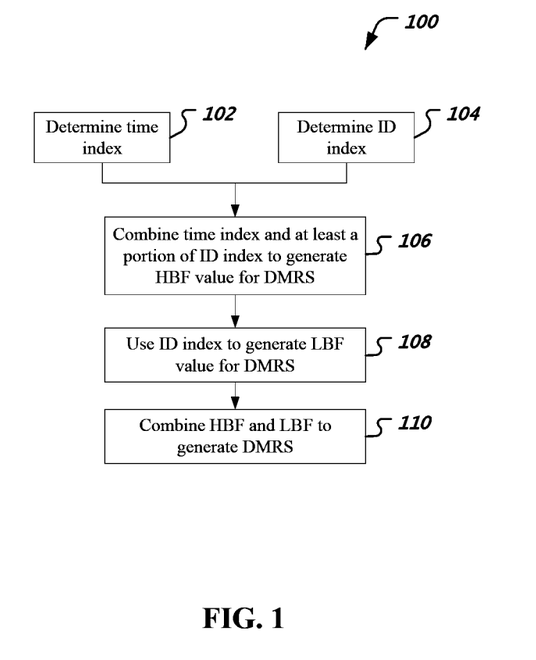
FIG. 1 is a flow chart illustrating a process for initializing a DMRS, in accordance with some embodiments of the presently disclosed technology.

FIG. 1 is a flow chart illustrating a process 100 for initializing a DMRS, in accordance with some embodiments of the presently disclosed technology. At block 102, the process includes determining time index information. Illustratively, for a base station, the time index can be cyclically reused in radio frames, slots, OFDM symbols, or other applicable time granularities. Therefore, base station itself has information about the current time index and can use the time index for DMRS initialization. Illustratively, for a UE, the time index can be acquired from Physical Broadcast Channel (PBCH) or Synchronization Signal (SS).

At block 104, the process includes determining ID index information. Illustratively, a base station can use either a physical ID, a configured ID, or both for DMRS initialization. If a base station does not configure an ID in certain time-frequency resource, the base station can use a physical ID for DMRS initialization. If a base station configures an ID for a UE or UE group in certain time-frequency resource, the base station can use the configured ID for DMRS initialization in certain time-frequency resource for the UE or UE group.

Illustratively, if a UE is not configured with an ID through Radio Resource Control (RRC) signal, the UE can use a physical cell ID for DMRS initialization. If a UE is configured with an ID through RRC signal for DMRS initialization in certain time-frequency resource, the UE can use the configured ID for DMRS initialization. In various embodiments, blocks 102 and 104 can be performed in parallel, in sequence, in partially overlapping timeframe, or in any other applicable temporal order.

At block 106, the process includes combining the time index and at least a portion of the ID index to generate an initial HBF value for initializing a DMRS. As will be discussed in various exemplary implementation embodiments below, the combining can include multiplication, bit shifting, modulo, exponential, exclusive or (XOR), or other applicable linear or non-linear operations involving the time index and at least a portion of the ID index.

At block 108, the process includes using the ID index to generate an initial LBF value for initializing the DMRS. As will be discussed in various exemplary implementation embodiments below, the value of every bit of the ID index can be used in the LBF. At block 110, the process includes combining the HBF value and the LBF value to generate the DMRS. Illustratively, the LBF value is appended to the HBF value to form an initial value of the DMRS.

The above mentioned methods and additional techniques are further explained in the following embodiments.

Exemplary Implementation 1

Figure 2:
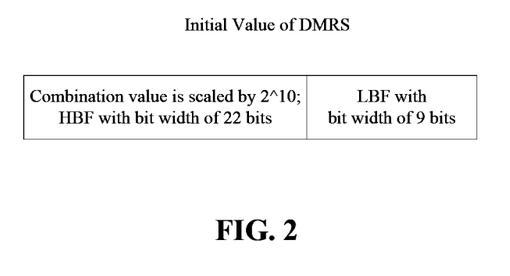
FIG. 2 illustrates a first example of DMRS sequence initialization, in accordance with some embodiments of the presently disclosed technology.

In some embodiments, all bits of the time index and all bits of the ID index are used for HBF calculation. In these embodiments, the bit width of the ID index is narrower than a threshold (e.g., 10 bits). FIG. 2 illustrates an example of DMRS sequence initialization in accordance with these embodiments. As illustrated, the total bit width of the initial DMRS value is 31 bits. A 9-bit long physical cell ID is used as the value of a 9-bit LBF portion of the initial DMRS value. The 22-bit HBF portion can be calculated as a combination of the time index and the ID index. In cases where this combination value may exceed the range of 22 bits, a modulo operation can be applied.

Description of Base Station Side

From the perspective of a base station, the radio network can work with sub-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14 or 12, and each symbol is associated with a unique symbol index within a slot.

The time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero.

In these embodiments, the DMRS can be initialized by equation 1-1 (or equation 1-2):

$$C_{init}=(2^{10}(iSFN*140*2^u+14n_{s,f}+l+1)(2*N_{ID}^{nSCID}+1)+N_{ID}^{nSCID})\mod 2^{31} \quad (Eq.\ 1\text{-}1)$$

$$C_{init}=2^{10}(14n_{s,f}+l+1)(2*N_{ID}^{nSCID}+1)+N_{ID}^{nSCID} \quad (Eq.\ 1\text{-}2)$$

In equation 1-1, iSFN represents the SFN number of a radio frame, and u represents the scale of numerology. For example, if 15 kHz is used as the reference subcarrier spacing and if u=1, then the subcarrier spacing is 15 kHz*$2^{\wedge}1$=30 kHz, and the OFDM symbol duration will be scaled down by ½. So the number of slots in a radio frame depends on the actual value of subcarrier spacing. In equation 1-2, SFN is a factor, so the maximum value generated by the equation will not exceed the range of $2^{\wedge}31$.

$n_{s,f}$ represents the slot index within a radio frame. The value of the slot index also depends on the scale value of u. Use the same value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station transmits the SFN number in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiments the ID can be a physical cell ID ranging from 0 to 1007.

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number. In these embodiment UE can use the physical cell ID for DMRS initialization.

Through the SS process, UE can also acquire the physical cell ID, based on the parameters acquired from the SS and PBCH. The UE can calculate the DMRS initial value using equation 1-1 (or equation 1-2).

As described above, The time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot.

In these embodiments, a UE can determine a DMRS sequence of PDCCH using only the information of PBCH and SS. In the DMRS initialization, because the ID index is represented by cell ID, the DMRS sequence can be differentiated by the uniqueness of ID and the non-linear combination to achieve improved cross correlation performance.

Exemplary Implementation 2

Figure 3:
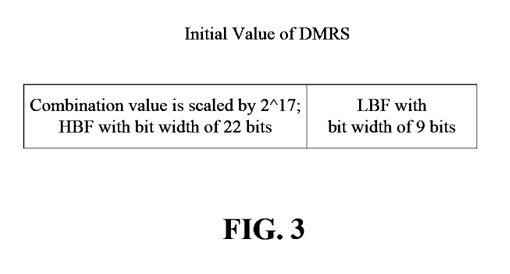
FIG. 3 illustrates a second example of DMRS sequence initialization, in accordance with some embodiments of the presently disclosed technology.

In some embodiments, all bits of the time index and all bits of the ID index are used for HBF calculation. In these embodiments, a combination value for the HBF is scaled by $2^{\wedge}17$ to achieve a unified equation for initializing DMRS with IDs having the same or different bit widths. FIG. 3 illustrates an example of DMRS sequence initialization in accordance with these embodiments. As illustrated, the total bit width of the initial DMRS value is 31 bits. A 9-bit long physical cell ID is used as the value of a 9-bit LBF portion of the initial DMRS value. The 22-bit HBF portion can be calculated as a combination of the time index and the ID index. In cases where this combination value may exceed the range of 22 bits, a modulo operation can be applied.

Description of Base Station Side

From the perspective of a base station, the radio network can work with sub-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero.

In these embodiments, the DMRS can be initialized by equation 2:

$$c_{init}=(2^{17}(iSFN*140*2^u+14n_{s,f}+l+1)(2*N_{ID}^{nSCID}+1)+N_{ID}^{nSCID})\bmod 2^{31} \quad \text{(Eq. 2)}$$

In equation 2, iSFN represents the SFN number of a radio frame, and u represents the scale of numerology. For example, if 15 kHz is used as the reference subcarrier spacing and if u=1, then the subcarrier spacing is 15 kHz*$2^{\wedge}1$=30 kHz, and the OFDM symbol duration will be scaled down by ½. So the number of slots in a radio frame depends on the actual value of subcarrier spacing.

$n_{s,f}$ represents the slot index within a radio frame. The value of the slot index also depends on the scale value of u. Use the same value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station transmits the SFN number in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiments the ID can be a physical cell ID ranging from 0 to 1007.

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number. In these embodiment UE can use the physical cell ID for DMRS initialization.

Through the SS process, UE can also acquire the physical cell ID, based on the parameters acquired from the SS and PBCH. The UE can calculate the DMRS initial value using equation 2.

As described above, the time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index. Through SS, the UE determines the ID, which is physical cell ID in these embodiments.

In these embodiments, a UE can determine a DMRS sequence of PDCCH using only the information of PBCH and SS. In the DMRS initialization, because the ID index is represented by cell ID, the DMRS sequence can be differentiated by the uniqueness of ID and the non-linear combination to achieve improved cross correlation performance.

These embodiments use a unified formula (e.g., by a base station and its associated UEs) for DMRS initialization with different ID bit widths.

Exemplary Implementation 3

Figure 4:
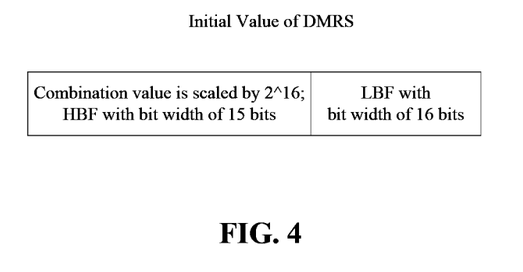
FIG. 4 illustrates a third example of DMRS sequence initialization, in accordance with some embodiments of the presently disclosed technology.

In some embodiments, all bits of the time index and all bits of the ID index are used for HBF calculation. In these embodiments, a combination value for the HBF is scaled by $2^{\wedge}16$ to achieve a more thorough traversal of the HBF value space. FIG. 4 illustrates an example of DMRS sequence initialization in accordance with these embodiments. As illustrated, the total bit width of the initial DMRS value is 31 bits. The LBF is 16-bit long and the HBF is 15-bit long.

Description of Base Station Side

From the perspective of a base station, the radio network can work with sub-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero.

In these embodiments, the DMRS can be initialized by equation 3:

$$c_{init}=(2^{16}(iSFN*140*2^u+14n_{s,f}+l+1)(2*N_{ID}^{nSCID}+1)+N_{ID}^{nSCID})\bmod 2^{31} \quad \text{(Eq. 3)}$$

In equation 3, iSFN represents the SFN number of a radio frame, and u represents the scale of numerology. For example, if 15 kHz is used as the reference subcarrier spacing and if u=1, then the subcarrier spacing is 15 kHz*$2^{\wedge}1$=30 kHz, and the OFDM symbol duration will be scaled down by ½. So the number of slots in a radio frame depends on the actual value of subcarrier spacing.

$n_{s,f}$ represents the slot index within a radio frame. The value of the slot index also depends on the scale value of u. Use the same value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station transmits the SFN number in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiments the ID can be configured through RRC signal.

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number.

Through the SS process, the UE can also acquire the physical cell ID, based on the parameters acquired from the SS and PBCH. The UE can calculate the DMRS initial value using equation 3.

As described above, the time index for DMRS sequence generation can include these parameters: a SFN number, a slot index, and an OFDM symbol index. The SFN number is broadcasted in PBCH, the slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index.

In these embodiments, a UE can determine a DMRS sequence of PDCCH using only the information of PBCH and SS. In the DMRS initialization, because the ID index is represented by cell ID, the DMRS sequence can be differentiated by the uniqueness of ID and the non-linear combination to achieve improved cross correlation performance. These embodiments use a unified formula (e.g., by a base station and its associated UEs) for DMRS initialization with different ID bit widths. Because not a single bit of the DMRS initial value has a fixed value, these embodiments can achieve improved performance in value dispersion.

Exemplary Implementation 4

Figure 5:
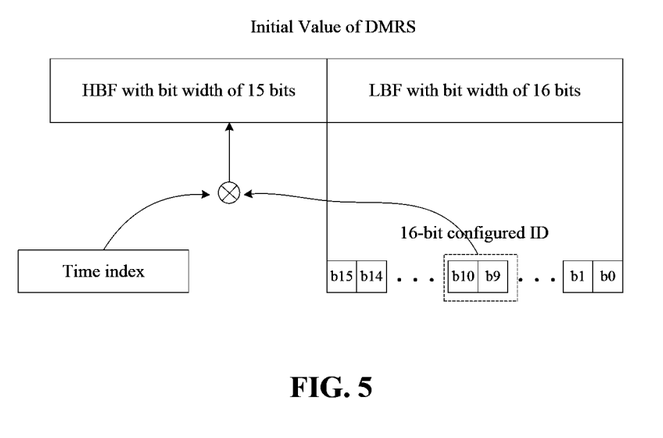
FIG. 5 illustrates a fourth example of DMRS sequence initialization, in accordance with some embodiments of the presently disclosed technology.

In some embodiments, all bits of the time index and a subset of bits of the ID index are used for HBF calculation. FIG. 5 illustrates an example of DMRS sequence initialization in accordance with these embodiments. As illustrated, the total bit width of the initial DMRS value is 31 bits. The LBF is 16-bit long and the HBF is 15-bit long. Some (but not all) bits of the ID index participate in the calculation of the HBF value, so that the calculated value does not exceed the value range that can be expressed by 15 bits.

Description of Base Station Side

From the perspective of a base station, the radio network can work with above-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a slot index and an OFDM symbol index. The OFDM symbol index in a slot also conforms to an ascending order starting from zero.

In these embodiments, the DMRS can be initialized by equation 4:

$$c_{init}=2^{16}(14n_{s,f}+l+1)(2*N_{p,ID}^{nSCID}+1)+N_{ID}^{nSCID} \quad \text{(Eq. 4)}$$

In equation 4, u represents the scale of numerology, $n_{s,f}$ represents the slot index within a radio frame. The value of the slot index depends on the scale value of u. Use the value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station transmits the SFN number in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiment the ID can be a configured ID. Through RRC signal, the base station can inform certain UE or UE group of the configured ID. The ID's bit width is 31 bits. $N_{p,ID}^{nSCID}$ is a subset of bits of $N_{ID}^{nSCID}$. For example, $N_{p,ID}^{nSCID}$ can be b9 and b10 of the configured ID.

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number.

After the UE connects with the network, it can receive RRC signal transmitted by the base station. Through the RRC signal, the UE can receive an ID (e.g., a configured ID) other than the physical cell ID to generate DMRS. The UE can calculate the DMRS initial value using equation 4.

As described above, the time index for DMRS sequence generation can include these parameters: a slot index and an OFDM symbol index. The slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index.

In these embodiments, a UE can determine a DMRS sequence of PDCCH using a configured ID other than a physical cell ID. The initialized DMRS can be differentiated by the uniqueness of ID and the non-linear combination to achieve improved cross correlation performance. These embodiments use a unified formula (e.g., by a base station and its associated UEs) for DMRS initialization with different ID bit widths. Modulo operation is not required because the HBF only uses partial bits of the ID index and the generated initial DMRS value is within the range expressed by 31 bits. Because not a single bit of the DMRS initial value has a fixed value, these embodiments can achieve improved performance in value dispersion.

Exemplary Implementation 5

Figure 6:
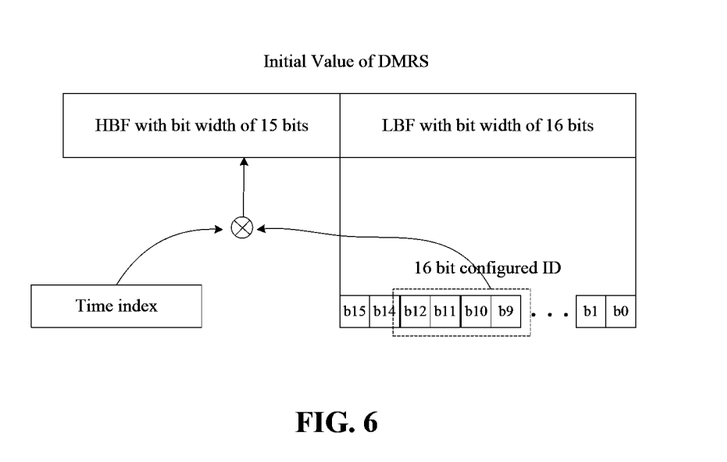
FIG. 6 illustrates a fifth example of DMRS sequence initialization, in accordance with some embodiments of the presently disclosed technology.

In some embodiments, all bits of the time index and a subset of bits of the ID index are used for HBF calculation. In these embodiments, more bits (as compared with exemplary implementation 4) of the ID index can be used for calculating the HBF value without exceeding the range expressed by 15 bits. FIG. 6 illustrates an example of DMRS sequence initialization in accordance with these embodiments. As illustrated, the total bit width of the initial DMRS value is 31 bits. The LBF is 16-bit long and the HBF is 15-bit long. Some (but not all) bits of the ID index participate in the calculation of the HBF value, so that the calculated value does not exceed the value range that can be expressed by 15 bits.

Figure 7:
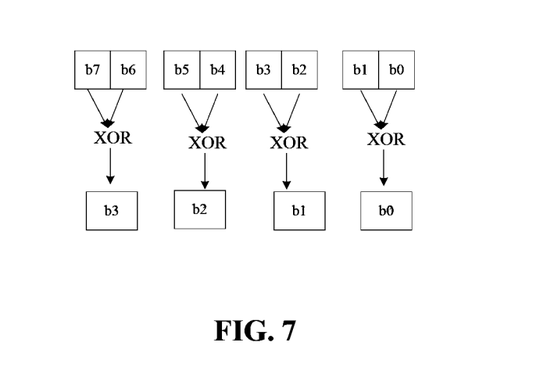
FIG. 7 illustrates an example of bit conversion, in accordance with some embodiments of the presently disclosed technology.

In some embodiments, the subset of ID bits can be converted or preprocessed so that even more ID bits can, to some extent, participate in HBF calculation. FIG. 7 illustrates an example of bit conversion where exclusive or (XOR) operations are applied to certain subset of ID bits (e.g., from b0 to b7) to generate a smaller set of converted bits (e.g., from b'0 to b'3). The smaller set of converted bits can be used for calculating the HBF value without exceeding the range expressed by 15 bits.

Description of Base Station Side

From the perspective of a base station, the radio network can work with above-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a slot index and an OFDM symbol index. The OFDM symbol index in a slot also conforms to an ascending order starting from zero.

In these embodiments, the DMRS can be initialized by equation 5:

$$c_{init}=2^{16}(14n_{s,f}+l+1)(N_{p,ID}^{nSCID}\pm 1)+N_{ID}^{nSCID} \quad \text{(Eq. 5)}$$

In equation 5, u represents the scale of numerology, $n_{s,f}$ represents the slot index within a radio frame. The value of the slot index depends on the scale value of u. Use the value of u=3 as an example, the total number of slots in a radio frame is 80 and therefore $n_{s,f}$ can range from 0 to 79.

l represents the OFDM symbol index within a slot, and this value is independent of the scale factor u. In these embodiments, l ranges from 0 to 13.

In these embodiments, the base station can transmit SFN number(s) in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiment the ID can be a configured ID. Through RRC signal, the base station can inform certain UE or UE group of the configured ID. The ID's bit width is 31 bits. $N_{p,ID}^{nSCID}$ is a subset of bits of $N_{ID}^{nSCID}$. For example, $N_{p,ID}^{nSCID}$ can be b9 through b12 of the configured ID.

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number.

After the UE connects with the network, it can receive RRC signal transmitted by the base station. Through the RRC signal, the UE can receive an ID (e.g., a configured ID) other than the physical cell ID to generate DMRS. The UE can calculate the DMRS initial value using equation 5.

As described above, the time index for DMRS sequence generation can include these parameters: a slot index and an OFDM symbol index. The slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index.

In these embodiments, a UE can determine a DMRS sequence of PDCCH using a configured ID other than a physical cell ID. The initialized DMRS can be differentiated by the uniqueness of ID and the non-linear combination to achieve improved cross correlation performance. These embodiments use a unified formula (e.g., by a base station and its associated UEs) for DMRS initialization with different ID bit widths. Modulo operation is not required because the HBF only uses partial bits of the ID index and the generated initial DMRS value is within the range expressed by 31 bits. More bits of the ID are used to calculate the HBF value allowing for larger span for different IDs and contributing to better sequence performance. Because not a single bit of the DMRS initial value has a fixed value, these embodiments can achieve improved performance in value dispersion.

Exemplary Implementation 6

Figure 8:
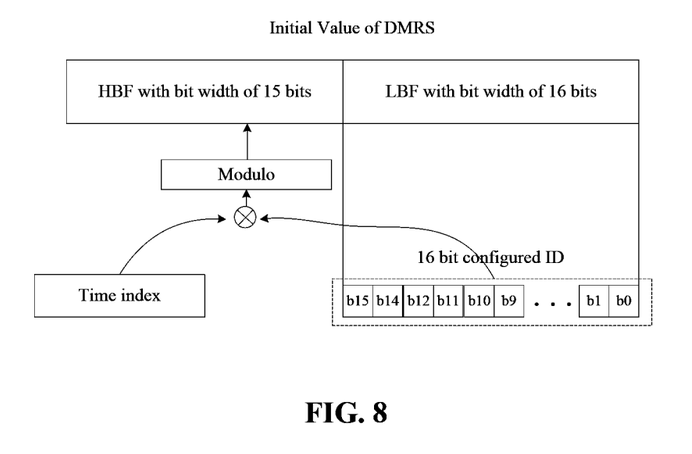
FIG. 8 illustrates a sixth example of DMRS sequence initialization, in accordance with some embodiments of the presently disclosed technology.

In some embodiments, all bits of the time index and all bits of the ID index are used for HBF calculation. In these embodiments, modulo operation is only applied to the combined value for generating HBF value. FIG. 8 illustrates an example of DMRS sequence initialization in accordance with these embodiments. As illustrated, the total bit width of the initial DMRS value is 31 bits. The LBF is 16-bit long and the HBF is 15-bit long. Similarly, all of the ID bits can be converted or preprocessed for participating in HBF calculation.

Description of Base Station Side

From the perspective of a base station, the radio network can work with above-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a slot index and an OFDM symbol index. The OFDM symbol index in a slot also conforms to an ascending order starting from zero.

In these embodiments, the DMRS can be initialized by equation 6:

$$c_{init}=2^{16}\{[(14n_{s,f}+l+1)(N_{ID}^{nSCID}+1)]\bmod 2^{15}\}+N_{ID}^{nSCID} \quad \text{(Eq. 6)}$$

In equation 6, u represents the scale of numerology, $n_{s,f}$ represents the slot index within a radio frame. The value of the slot index depends on the scale value of u. Use the value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station can transmit SFN number(s) in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{nSCID}$ is the ID for DMRS sequence generation, in these embodiment the ID can be a configured ID. Through RRC signal, the base station can inform certain UE or UE group of the configured ID. The ID's bit width is 31 bits.

In some embodiments, equation 6 can be further modified as follows:

$$c_{init}=2^{16}\{[(14n_{s,f}+l+1)(N_{even}N_{ID}^{nSCID}+1)] \mod 2^{15}\}+N_{ID}^{nSCID} \text{ where } N_{even} \text{ is an even number.}$$

Description of User Equipment Side

In these embodiments, a UE executes a SS process and determines the boundary of a radio frame and the slot index. The UE can also determine the OFDM symbol index through the SS process. The UE can receive PBCH signals, from which UE can determine the SFN number.

After the UE connects with the network, it can receive RRC signal transmitted by the base station. Through the RRC signal, the UE can receive an ID (e.g., a configured ID) other than the physical cell ID to generate DMRS. The UE can calculate the DMRS initial value using equation 6 or modified equation 6.

As described above, the time index for DMRS sequence generation can include these parameters: a slot index and an OFDM symbol index. The slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index.

In these embodiments, a UE can determine a DMRS sequence of PDCCH using a configured ID other than a physical cell ID. The initialized DMRS can be differentiated by the uniqueness of ID and the non-linear combination to achieve improved cross correlation performance. These embodiments use a unified formula (e.g., by a base station and its associated UEs) for DMRS initialization with different ID bit widths. Because not a single bit of the DMRS initial value has a fixed value, these embodiments can achieve improved performance in value dispersion. Modulo operation is only applied to the combined value, so that the HBF is traversed more adequately.

Exemplary Implementation 7

Figure 9:
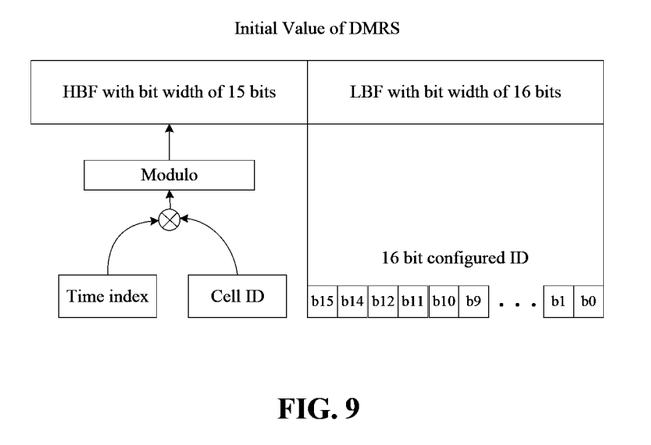
FIG. 9 illustrates a seventh example of DMRS sequence initialization, in accordance with some embodiments of the presently disclosed technology.

In some embodiments, all bits of the time index and all bits of the ID index are used for HBF calculation. In these embodiments, the ID parameter (e.g., cell ID) that contributes to the HBF combined value is different from the ID parameter (e.g., configured ID) that contributes to the LBF, and modulo operation is only applied to the combined value for generating HBF value. FIG. 9 illustrates an example of DMRS sequence initialization in accordance with these embodiments. As illustrated, the total bit width of the initial DMRS value is 31 bits. The LBF is 16-bit long and the HBF is 15-bit long.

Description of Base Station Side

From the perspective of a base station, the radio network can work with above-6 GHz spectrum in accordance with these embodiments. A base station can transmit information in different levels of time granularity, such as system frame number (SFN), slot, and OFDM symbol. A radio frame (e.g., 10 ms) includes a certain number of slots. SFN numbers are cyclically used in a network. In these embodiments, the SFN number ranges from 0 to 1023.

Synchronization signal (SS) is transmitted in certain OFDM symbol within a radio frame. Each slot index is unique within a radio frame, and each slot includes of certain number of OFDM symbols. The number of OFDM symbols can vary among embodiments. In these embodiments, the number of OFDM symbols in each slot can be 14, and each symbol is associated with a unique symbol index within a slot.

The time index for DMRS sequence generation can include these parameters: a slot index and an OFDM symbol index. The OFDM symbol index in a slot also conforms to an ascending order starting from zero.

In these embodiments, the DMRS can be initialized by equation 7:

$$c_{init}=2^{16}\{[(14n_{s,f}+l+1)(N_{ID}^{cell}+1)] \mod 2^{15}\}+N_{ID}^{nSCID} \quad \text{(Eq. 7)}$$

In equation 7, u represents the scale of numerology, $n_{s,f}$ represents the slot index within a radio frame. The value of the slot index depends on the scale value of u. Use the value of u=1 as an example, the total number of slots in a radio frame is 20 and therefore $n_{s,f}$ can range from 0 to 19.

l represents the OFDM symbol index within a slot, and this value is independent of the scale factor u. In these embodiments, l ranges from 0 to 13.

In these embodiments, the base station can transmit SFN number(s) in PBCH, and the slot index and OFDM symbol index conform to ascending orders. For sub-6 GHz the value of the scale factor can be selected from 0 to 2; for above-6 GHz, the scale factor can be selected from 2 to 4.

$N_{ID}^{cell}$ is the physical ID of a serving cell, different cells have distinct IDs.

$N_{ID}^{nSCID}$ is the ID for DMRS sequence generation, in these embodiment the ID can be a configured ID. Through RRC signal, the base station can inform certain UE or UE group of the configured ID. The ID's bit width is 31 bits.

Description of User Equipment Side

In these embodiments, a UE executes a SS process and determines the boundary of a radio frame and the slot index. The UE can also determine the OFDM symbol index through the SS process. After the SS process, the UE can determine the physical cell ID of its associated cell.

After the UE connects with the network, it can receive RRC signal transmitted by the base station. Through the RRC signal, the UE can receive an ID (e.g., a configured ID) other than the physical cell ID. The UE can use the RRC configured ID and the physical cell ID to calculate the DMRS initial value using equation 7.

As described above, the time index for DMRS sequence generation can include these parameters: a slot index and an OFDM symbol index. The slot index conforms to an ascending order within a radio frame (whose number is SFN). The OFDM symbol index in a slot also conforms to an ascending order starting from zero. The UE can deduce the slot index and OFDM symbol index based on the slot boundary for the OFDM symbol in a slot. PBCH can inform the UE of the SFN and scale value u, based on which the UE can determine the time index. Through SS, the UE can determine the physical cell ID.

In these embodiments, a UE can determine a DMRS sequence of PDCCH using a configured ID and a physical cell ID. The initialized DMRS can be differentiated by the uniqueness of ID and the non-linear combination to achieve improved cross correlation performance. These embodiments use a unified formula (e.g., by a base station and its associated UEs) for DMRS initialization with different ID bit widths. Because not a single bit of the DMRS initial value has a fixed value, these embodiments can achieve improved performance in value dispersion. Modulo operation is only applied to the combined value, so that the HBF is traversed more adequately. In cases where two UE are configured with a same ID in a synchronous network, corresponding DMRS initialization can be further differentiated by cell ID to avoid consistent collision.

Figure 10:
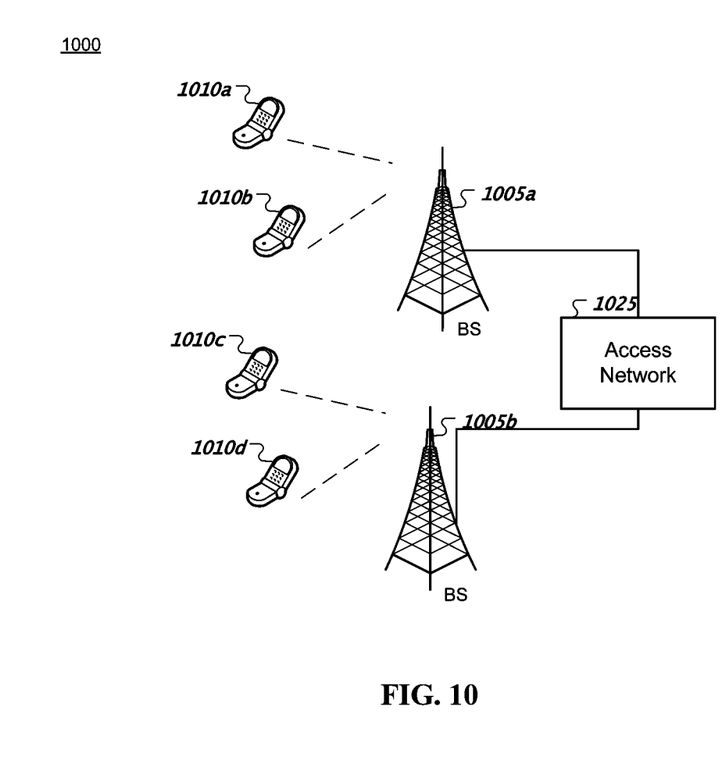
FIG. 10 shows an example of a wireless communication system where techniques in accordance with one or more embodiments of the presently disclosed technology can be applied.

FIG. 10 shows an example of a wireless communication system where techniques in accordance with one or more embodiments of the presently disclosed technology can be applied. A wireless communication system 1000 can include one or more base stations (BSs) 1005a, 1005b, one or more UE 1010a, 1010b, 1010c, 1010d, and an access network 1025. A base station 1005a or 1005b can provide wireless service to UE 1010a, 1010b, 1010c, or 1010d in one or more wireless sectors. In some implementations, a base station 1005a or 1005b includes directional antennas to produce two or more directional beams to provide wireless coverage in different sectors.

The access network 1025 can communicate with one or more base stations 1005a, 1005b. In some implementations, the access network 1025 includes one or more base stations 1005a, 1005b. In some implementations, the access network 1025 is in communication with a core network (not shown) that provides connectivity with other wireless communication systems and wired communication systems. The core network may include one or more service subscription databases to store information related to the subscribed UE 1010a, 1010b, 1010c and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The access network 1025 can support multiple different radio access technologies.

In some implementations, a wireless communication system can include multiple networks using different wireless technologies. A dual-mode or multi-mode UE includes two or more wireless technologies that could be used to connect to different wireless networks.

Figure 11:
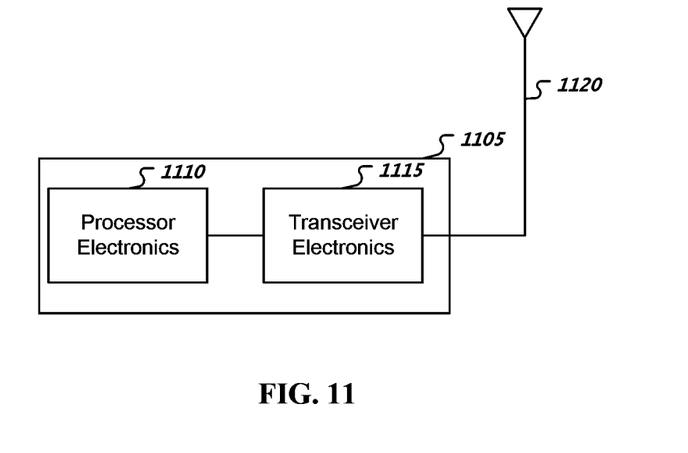
FIG. 11 is a block diagram representation of at least a portion of a wireless communication node (e.g., radio station), in accordance with some embodiments of the presently disclosed technology.

FIG. 11 is a block diagram representation of at least a portion of a wireless communication node (e.g., radio station), in accordance with some embodiments of the presently disclosed technology. A communication node 1105 such as a base station or a UE can include processor electronics 1110 such as a microprocessor that implements one or more of the wireless techniques presented in this document. The communication node 1105 can include transceiver electronics 1115 to send and/or receive wireless signals over one or more communication interfaces such as antenna 1120. The communication node 1105 can include other communication interfaces for transmitting and receiving data. The communication node 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the communication node 1105.

In some embodiments, a method of wireless communication performed by a communication node may include transmitting or receiving a DMRS signal. An initial value of the DMRS signal includes a first portion that is dependent on a time index and an ID index, as described herein, and a second portion that is dependent on the ID index. For example, as described herein, the second portion may be independent of the time index. The communication node may be a base station or a user device.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication performed by a communication node, comprising:
   generating a first portion of an initial value of a demodulation reference signal (DMRS) based, at least in part, on combining a time index and at least a portion of an identification (ID) index,
      wherein the combining the time index and at least the portion of the ID index includes converting a subset of the ID index to obtain the portion of the ID index,
      wherein a number of bits of the portion of the ID index is less than that of the subset of ID index, and
      wherein the converting includes applying one or more exclusive or (XOR) operations to the subset of the ID index;
   generating a second portion of the initial value of the DMRS based, at least in part, on the ID index;
   generating the initial value of the DMRS by combining at least the first portion and the second portion; and
   transmitting the DMRS.

2. The method of claim 1,
   wherein the first portion corresponds to a higher bit field of the initial value of the DMRS, wherein the higher bit field corresponds to a plurality of consecutive bits including a most significant bit (MSB) of the initial value of the DMRS, wherein the second portion corresponds to a lower bit field of the initial value of the DMRS, and wherein the lower bit field corresponds to a plurality of consecutive bits including a least significant bit (LSB) of the initial value of the DMRS.

3. The method of claim 1, wherein the time index is based on at least one of a system frame number (SFN), a slot index, or an Orthogonal Frequency-Division Multiplexing (OFDM) symbol number.

4. The method of claim 1, wherein the ID index is based on at least one of a cell ID or a configured ID communicated via Radio Resource Control (RRC) signal.

5. The method of claim 1, wherein the combining the time index and at least the portion of the ID index includes combining the time index and an entirety of the ID index.

6. The method of claim 1, wherein the combining the time index and at least the portion of the ID index includes multiplying a value corresponding to the time index with a value corresponding to the at least the portion of the ID index.

7. An apparatus for wireless communication, comprising:
a processor configured to:
generate a first portion of an initial value of a demodulation reference signal (DMRS) based, at least in part, on a combination of a time index and at least a portion of an identification (ID) index,
wherein the combination of the time index and at least the portion of the ID index includes a subset of the ID index being converted to obtain the portion of the ID index,
wherein a number of bits of the portion of the ID index is less than that of the subset of ID index, and
wherein the subset of the ID is converted by an application of one or more exclusive or (XOR) operations to the subset of the ID index;
generate a second portion of the initial value of the DMRS based, at least in part, on the ID index;
generate the initial value of the DMRS by combining at least the first portion and the second portion; and
transmit the DMRS.

8. The apparatus of claim 7,
wherein the first portion corresponds to a higher bit field of the initial value of the DMRS,
wherein the higher bit field corresponds to a plurality of consecutive bits including a most significant bit (MSB) of the initial value of the DMRS,
wherein the second portion corresponds to a lower bit field of the initial value of the DMRS, and
wherein the lower bit field corresponds to a plurality of consecutive bits including a least significant bit (LSB) of the initial value of the DMRS.

9. The apparatus of claim 7, wherein the time index is based on at least one of a system frame number (SFN), a slot index, or an Orthogonal Frequency-Division Multiplexing (OFDM) symbol number.

10. The apparatus of claim 7, wherein the ID index is based on at least one of a cell ID or a configured ID communicated via Radio Resource Control (RRC) signal.

11. The apparatus of claim 7, wherein the combination of the time index and at least the portion of the ID index includes a combination of the time index and an entirety of the ID index.

12. The apparatus of claim 7, wherein the combination of the time index and at least the portion of the ID index includes a multiplication of a value corresponding to the time index with a value corresponding to the at least the portion of the ID index.

13. A non-transitory computer readable medium having code stored thereon, the code when executed by a processor, causing the processor to implement a method comprising:
generating a first portion of an initial value of a demodulation reference signal (DMRS) based, at least in part, on combining a time index and at least a portion of an identification (ID) index,
wherein the combining the time index and at least the portion of the ID index includes converting a subset of the ID index to obtain the portion of the ID index,
wherein a number of bits of the portion of the ID index is less than that of the subset of ID index, and
wherein the converting includes applying one or more exclusive or (XOR) operations to the subset of the ID index;
generating a second portion of the initial value of the DMRS based, at least in part, on the ID index;
generating the initial value of the DMRS by combining at least the first portion and the second portion; and
transmitting the DMRS.

14. The non-transitory computer readable medium of claim 13,
wherein the first portion corresponds to a higher bit field of the initial value of the DMRS,
wherein the higher bit field corresponds to a plurality of consecutive bits including a most significant bit (MSB) of the initial value of the DMRS,
wherein the second portion corresponds to a lower bit field of the initial value of the DMRS, and
wherein the lower bit field corresponds to a plurality of consecutive bits including a least significant bit (LSB) of the initial value of the DMRS.

15. The non-transitory computer readable medium of claim 13, wherein the time index is based on at least one of a system frame number (SFN), a slot index, or an Orthogonal Frequency-Division Multiplexing (OFDM) symbol number.

16. The non-transitory computer readable medium of claim 13, wherein the ID index is based on at least one of a cell ID or a configured ID communicated via Radio Resource Control (RRC) signal.

17. The non-transitory computer readable medium of claim 13, wherein the combining the time index and at least the portion of the ID index includes combining the time index and an entirety of the ID index.

18. The non-transitory computer readable medium of claim 13, wherein the combining the time index and at least the portion of the ID index includes multiplying a value corresponding to the time index with a value corresponding to the at least the portion of the ID index.

* * * * *